United States Patent
Yoshii

(10) Patent No.: US 6,233,352 B1
(45) Date of Patent: *May 15, 2001

(54) INFORMATION PROCESSING METHOD AND APPARATUS

(75) Inventor: Hiroto Yoshii, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/547,443

(22) Filed: Oct. 24, 1995

(30) Foreign Application Priority Data

Oct. 28, 1994 (JP) .................................................. 6-265054

(51) Int. Cl.$^7$ ............................... G06K 9/62; G06T 1/40
(52) U.S. Cl. ............................................. 382/157; 382/226
(58) Field of Search .................................. 382/226, 224, 382/240, 155, 159, 302, 157, 227, 228, 156; 706/19, 20

(56) References Cited

U.S. PATENT DOCUMENTS

| | | | |
|---|---|---|---|
| 5,022,091 | * 6/1991 | Carlson ................................ | 382/302 |
| 5,029,223 | * 7/1991 | Fujisaki ................................ | 382/187 |
| 5,058,184 | * 10/1991 | Fukushima ........................... | 382/158 |
| 5,067,166 | * 11/1991 | Ito ........................................ | 382/226 |
| 5,218,646 | * 6/1993 | Sirat et al. ........................... | 382/155 |
| 5,329,596 | * 7/1994 | Sakou et al. ......................... | 382/226 |
| 5,444,796 | * 8/1995 | Ornstein .............................. | 382/157 |
| 5,463,773 | * 10/1995 | Sakakibara et al. ................. | 395/600 |
| 5,479,523 | * 12/1995 | Gaborski et al. .................... | 382/159 |
| 5,533,148 | * 7/1996 | Sayah et al. ......................... | 382/240 |
| 5,638,491 | * 6/1997 | Moed .................................... | 706/20 |

FOREIGN PATENT DOCUMENTS 6-52537   7/1994 (JP) .

OTHER PUBLICATIONS

Park. "A Mapping from Linear Tree Classifiers to Neural Net Classifiers." IEEE Int. Conf. Neural Networks, IEEE World Congress on Computational Intelligence, vol. 1, pp. 94–100, Jul. 1994.*
Sethi. "Entropy Nets: From Decision Trees to Neural Networks." Proceedings of the IEEE, vol.78, No. 10, pp. 1605–1613, Oct. 1990.*
Farrell et al. "Speaker Recognition Using Neural Networks and Conventional Classifiers." IEEE Trans. on Speech and Audio Processing, vol. 2, No. 1, pp. 194–205.*
Guo et al. "Classification Trees with Neural Network Feature Extraction." Proceedings CVPR, IEEE Computer Society Conference on Computer Vision and Pattern Recognition, pp. 183–188, Jun. 1992.*
Sethi et al., "Design Of Multicategory Multifeature Split Decision Trees Using Perceptron Learning", Pattern Recognition, vol. 27, No. 7, Jul. 1, 1994, pp. 939–947.
Guo et al., "Classification Trees with Neural Network Feature Extraction", IEEE Transactions on Neural Networks, vol. 3, No. 6, Nov. 1, 1992, pp. 923–933.
Pernus et al., "Two–dimensional object recognition using multiresolution non–information–preserving shape features", Pattern Recognition Letters, vol. 15, No. 6, Nov. 1, 1994, pp. 1071–1079.
L. Breiman, et al., Classification And Regression Trees, 1993, pp. 103 and 104.

* cited by examiner

*Primary Examiner*—Jon Chang
(74) *Attorney, Agent, or Firm*—Fitzpatrick, Cella, Harper & Scinto

(57) ABSTRACT

A classification tree which allows direct recoginition of an input pattern such as image or sound without extra processing such as pre-processing of unprocessed pattern data having high order characteristic variables is prepared. Information processing method and apparatus conduct hierarchical pre-processing for hierarchically pre-processing a learning pattern, prepares a classification tree based on the learning pattern processed by the hierarchical pre-processing and conducts the recognition by using the classification tree.

60 Claims, 8 Drawing Sheets

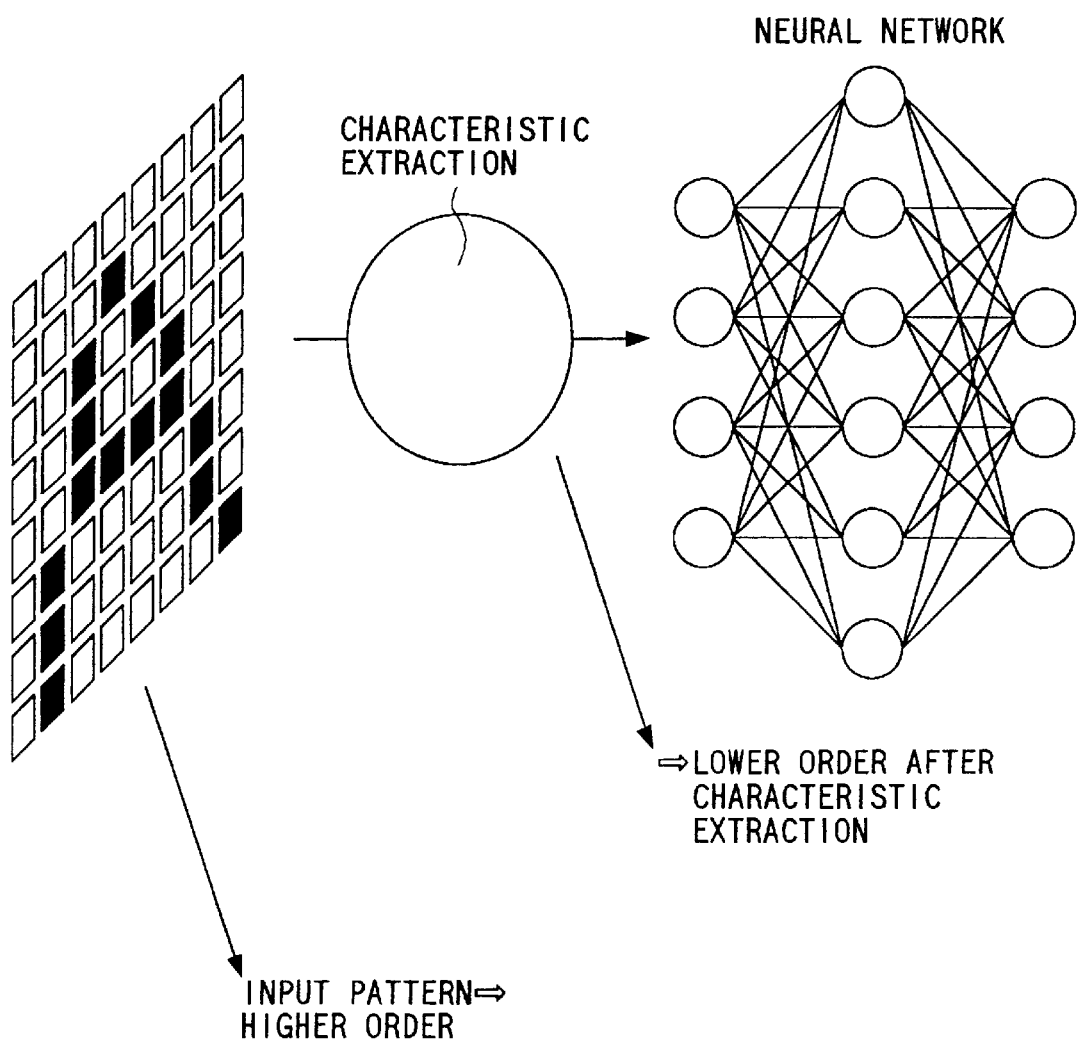

INFORMATION PROCESSING METHOD AND APPARATUS

BACKGROUND OF THE INVENTION

1. Field of the Invention

The present invention relates to an information processing method and an apparatus relating to a classification method for classifying patterns such as images, sounds and characters into categories.

The present invention further relates to an information processing method and an apparatus suitable for recognizing information of images, sounds and characters.

2. Related Background Art

In a prior art method of pattern recognition, a recognition method using a neural network has been known. A great feature of the neural network resides in that a powerful learn algorithm represented by an error inverse propagation algorithm is provided. Because of this feature, the neural network has been adopted in a wide field of pattern recognition.

Another method for pattern recognition is a method for classifying a pattern into a category by using classification trees stepwise. For example, in the pattern recognition system disclosed in JP-B-6-52537, characteristic axes are numbered and they are categorized in accordance with the numbers.

A method for categorizing based on primary coupling of characteristic variables is also known. In general, a better result is provided by using the primary coupling of characteristic variables than using the characteristic axes one by one.

However, the above prior art techniques have the following defects.

1. The range of the characteristic variables to which the neural network is applicable is in the order of 10, and when input variables include higher order variables, some category pre-separation or character extraction is needed. In addition, when pre-processing such as category pre-separation or character extraction is conducted, an error may be included during the pre-processing and a final recognition rate is not that high even if the neural network is constructed with a high precision.

2. The range of character variables to which the classification trees are applicable is also in the order of 10, and when higher order characteristic variables are to be processed, the construction of the classification trees is virtually impossible.

3. In the actual pattern recognition, the orders of character variables of unprocessed data ranges between 100 and 1000. Thus, it is impossible to use the existing neural network and the classification trees which allow only the order of 10 to the actual pattern recognition as they exist.

SUMMARY OF THE INVENTION

The present invention comprises a hierarchical pre-processing step for hierarchically pre-processing input learning patterns and a classification tree preparation step for preparing a classification tree based on the learning patterns processed in the hierarchical pre-processing step. As a result, a high recognition factor is attained with a high efficiency even if input variables possess high order characteristics.

The present invention attains high efficiency categorization by degenerating the characteristic variables of the learning patterns stepwise in the hierarchical pre-processing step.

The present invention comprises a developed variable discrimination step for selecting variables in accordance with a relation between a higher hierarchy and a lower hierarchy in the classification tree preparation step, and develops the degenerated variables toward the lower hierarchy based on a result of the developed variable discrimination step to attain the efficient categorization.

The present invention recognizes the input pattern by using the prepared classification tree to attain the high recognition factor efficiently.

The present invention prepares a recognition template based on the prepared classification tree and recognizes the input pattern by using the template to attain the high recognition rate efficiently.

The present invention allows the recognition of hand-written characters efficiently at a high recognition factor by inputting a hand-written character pattern as the input pattern.

The present invention allows the recognition of a optically read character pattern efficiently at a high recognition factor by inputting the optically read character pattern as an input pattern.

The present invention allows the recognition of sound efficiently at a high recognition factor by inputting a sound pattern as an input pattern.

BRIEF DESCRIPTION OF THE DRAWINGS

FIG. 9 shows an application of a prior art neural network.

DETAILED DESCRIPTION OF THE PREFERRED EMBODIMENTS

A preferred embodiment of the present invention is explained with reference to the accompanying drawings.

[Embodiment 1]

Figure 2:
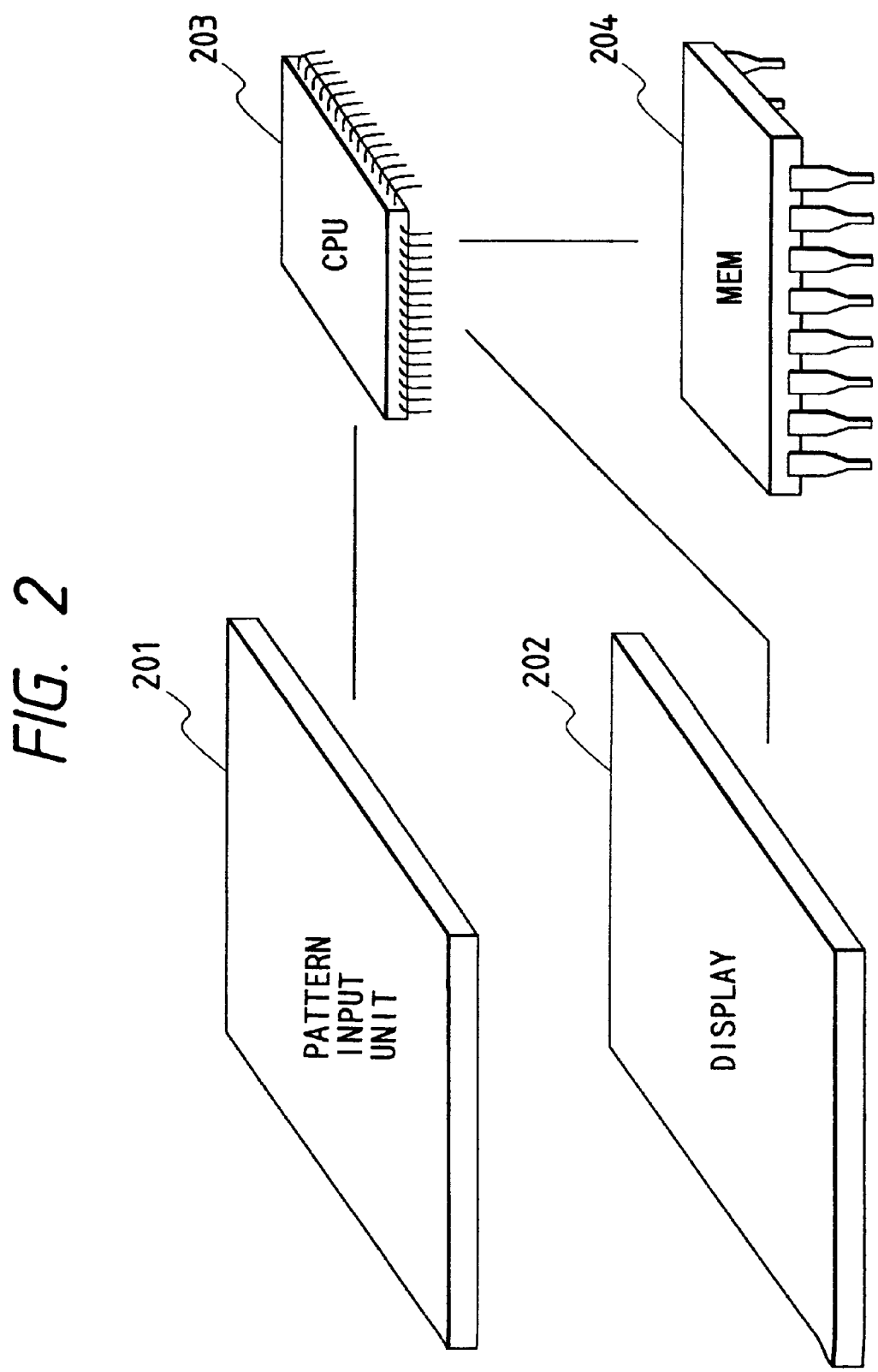
FIG. 2 shows a block diagram of a configuration of an information processing apparatus of the embodiment.

FIG. 2 shows a configuration of an information processing apparatus to which the pattern recognition method of the present invention is applied.

A pattern recognition apparatus comprises a pattern input unit 201, a display unit 202, a central processing unit (CPU) 203 and a memory 204.

The pattern input unit 201 comprises a digitizer for on-line character recognition and coordinate data of a character or graphics inputted on the digitizer by a stylus is delivered to the CPU 203. The pattern input unit is not limited to the combination of the digitizer and the stylus but it may by a scanner (for inputting binary pattern data) or microphone (for inputting a sound pattern) so long as it can input a pattern to be recognized. The display unit 202 displays unprocessed pattern data inputted by the pattern input unit 201 and a result of recognition by the CPU 203.

The CPU 203 recognizes the input pattern and executes a process shown in a flow chart to be described later in accordance with a control program stored in the memory 204 and controls all units. The memory 204 stores a recognition program and a dictionary to be used by the CPU 203 and stores variable parameters to be used by the recognition program and data produced during the recognition process.

Figure 1:
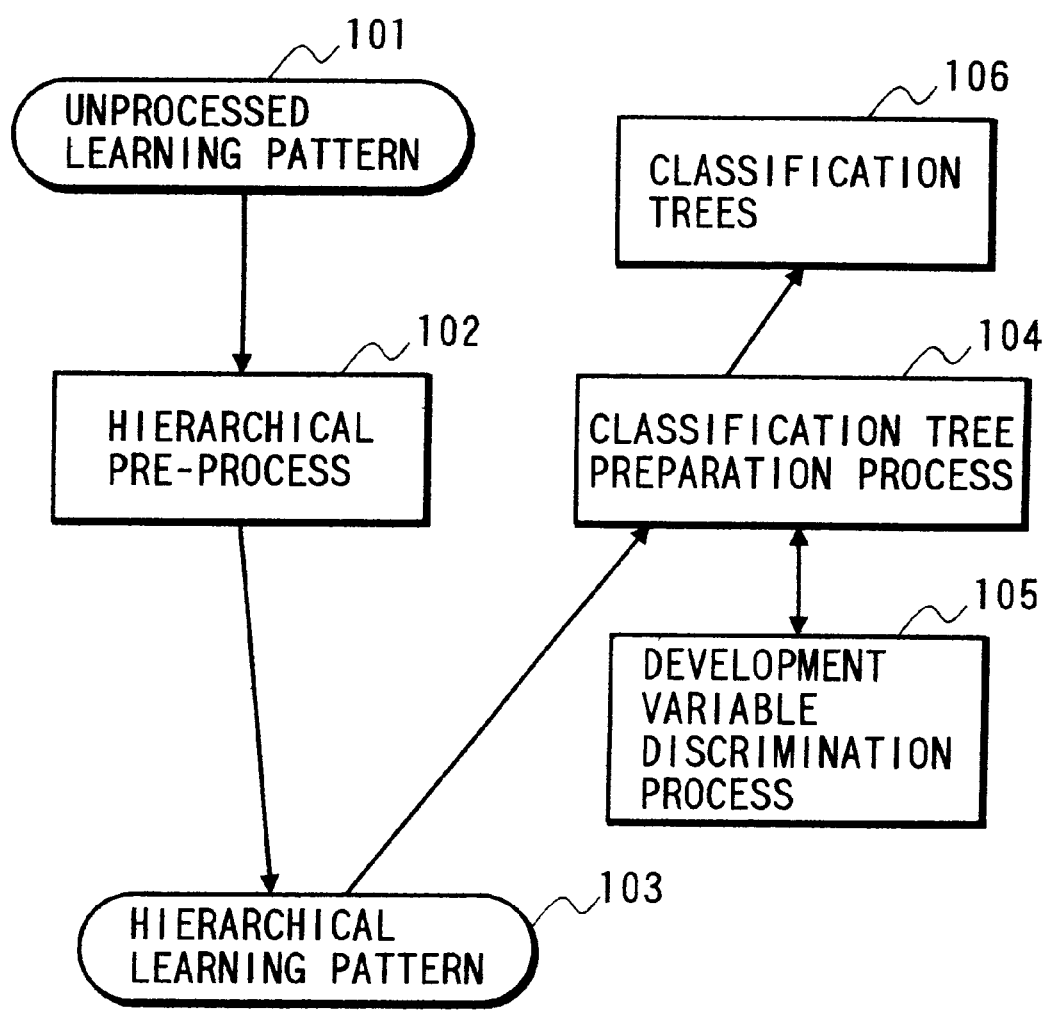
FIG. 1 shows a method for preparing a dictionary for pattern recognition in one embodiment of the present invention.

FIG. 1 shows a pattern recognition dictionary preparation method and a pattern recognition method in the present embodiment. Numeral 101 denotes an unprocessed learning pattern, numeral 102 denotes a hierarchical pre-process for delivering the unprocessed learning pattern to a neural network, numeral 103 denotes a hierarchical learning pattern processed by the neural network, numeral 104 denotes classification tree preparation for preparing a classification tree based on the hierarchical learning pattern, numeral 105 denotes developed variable discrimination used during the preparation of the classification tree by the classification tree preparation, and numeral 106 denotes a final classification tree.

In the present embodiment, an input is the unprocessed learning pattern and an output is the classification tree.

Referring to FIGS. 3 to 7, an operation of the present invention is explained.

Figure 5:
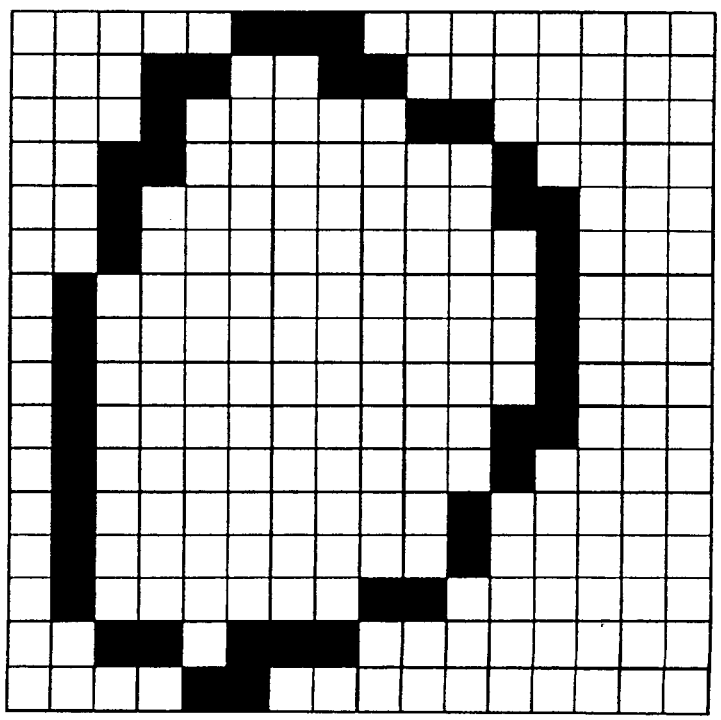
FIG. 5 shows a learning pattern.

Ten different numerals '0' to '9' drawn on a 16×16 mesh are assumed as a category of the input patterns. A '0' input pattern is shown in FIG. 5. It is assumed that learning patterns inputted for preparing the dictionary include '0' to '9' with each category including 100 patterns. That is, 100 templates are prepared for each category. The templates prepared from the learning patterns are designated by $LT_{i,j}$ (learning template i, j, where i is a suffix indicating a category and $0 \leq i \leq 9$, and j is a suffix indicating a template number and $1 \leq j \leq 100$).

Figure 3:
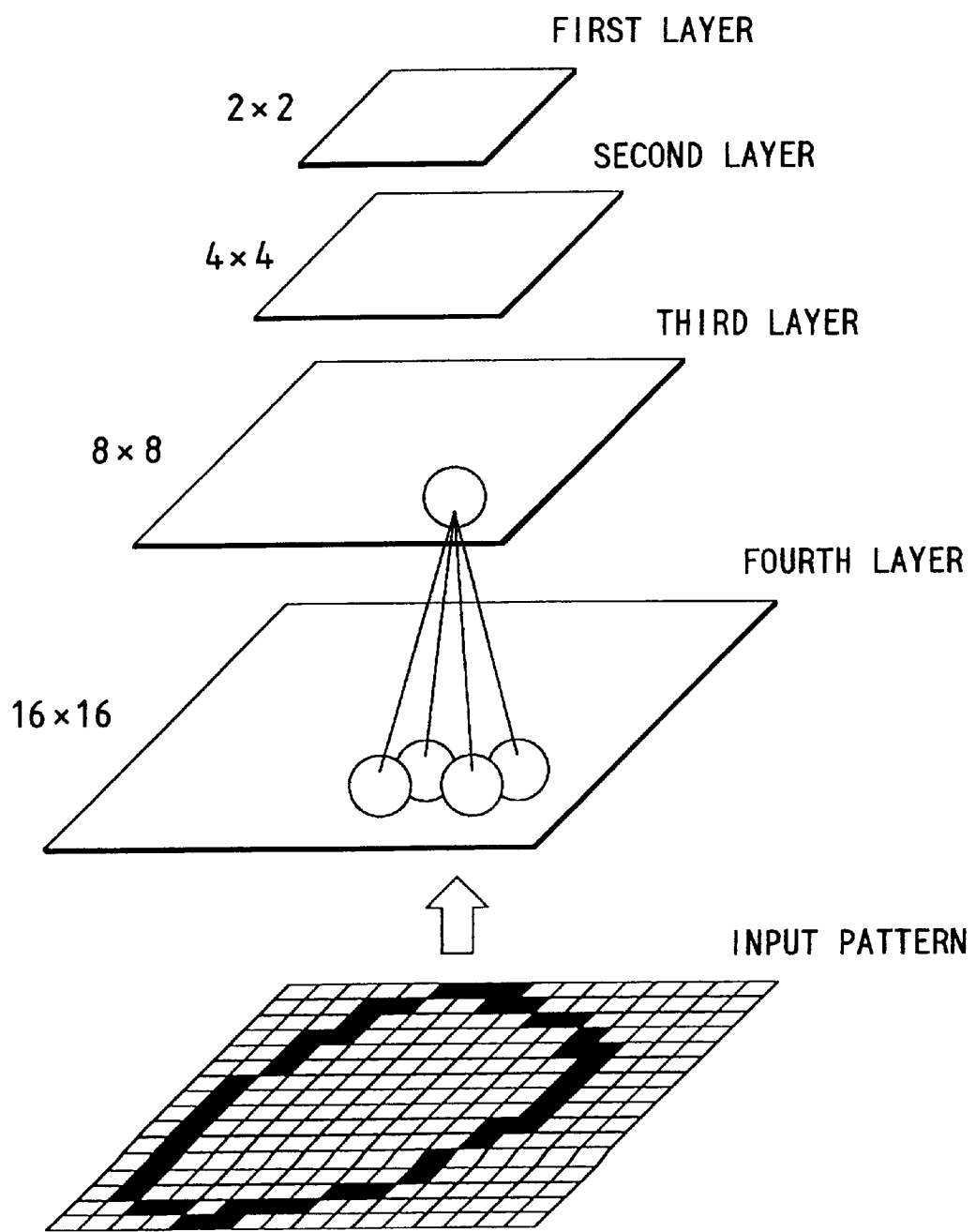
FIG. 3 shows a structure of a neural network used in the present embodiment.

Based on the above assumption, a four-hierarchy neural network as shown in FIG. 3 is constructed. The four hierarchies in FIG. 3 comprises 2×2, 4×4, 8×8 and 16×16 neuron groups, respectively.

Figure 4:
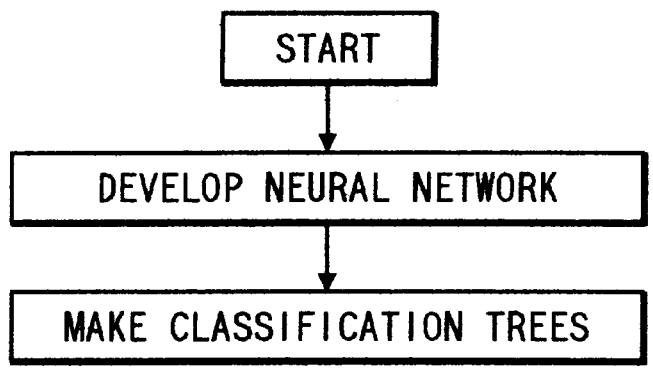
FIG. 4 shows a flow chart of a flow in a pattern recognition dictionary preparation process of the embodiment.

As shown in a flow chart of FIG. 4, the pattern recognition dictionary preparation process of the present embodiment is executed through two steps, a neural network developing phase and a classification tree preparation phase. The respective phases are explained in sequence.

(1) Neural Network Developing Phase

The learning templates are inputted as the lowest layer 16×16 neurons of FIG. 3. It is assumed that the neurons are off at white portions of the input pattern ($LT_{i,j}$) and the neurons are on at black portions. (In the following description, black and neuron on, and white and neuron off are interchangeably used.)

Figure 6:
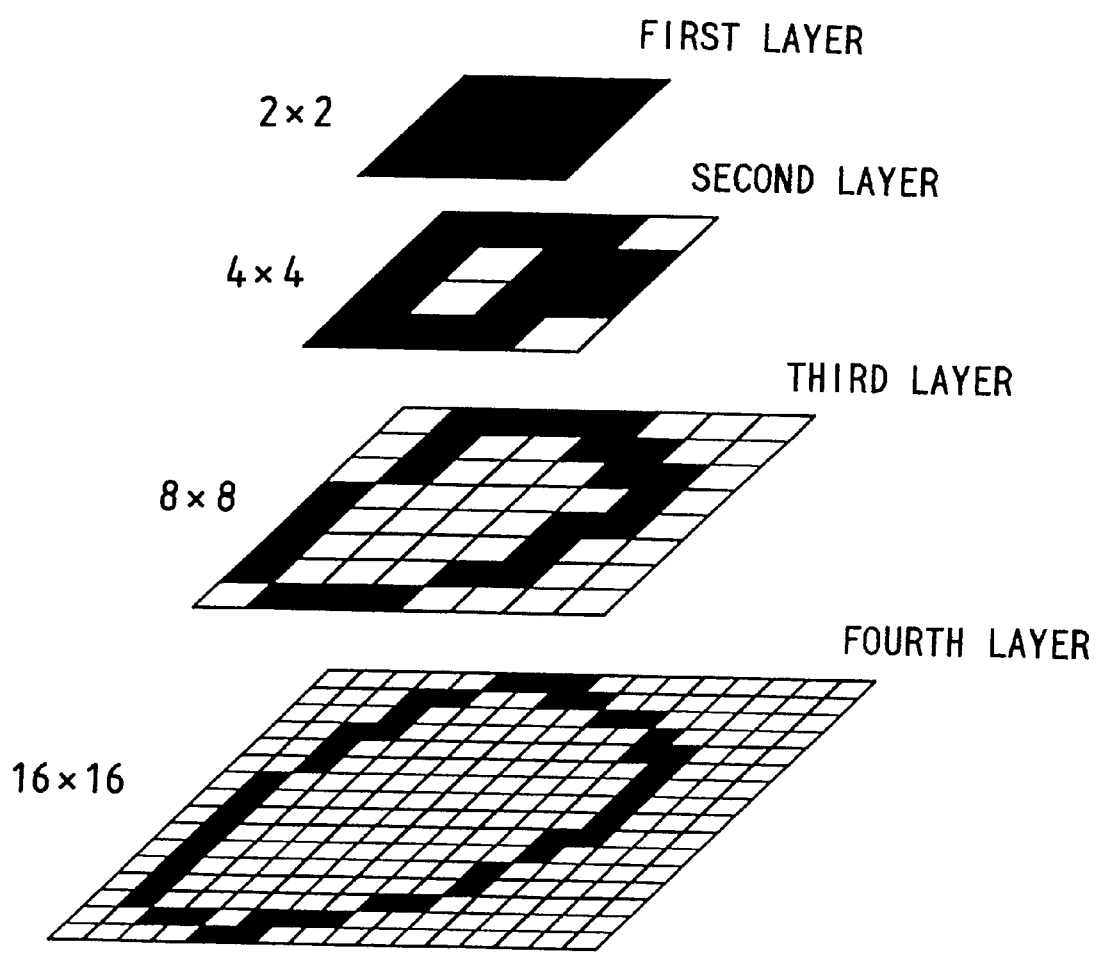
FIG. 6 shows a hierarchical learning pattern.

The structure of the neural network is very simple. Namely, the input pattern is processed toward upper layer with a convention that if there is at least one on neuron in one 2×2 neuron group in a lower layer, a corresponding neuron in the immediately upper layer is set on. A learning template shown in FIG. 5 is processed in the neural network developing process to prepare a neural network comprising first to fourth layers as shown in FIG. 6.

A characteristic space of the input pattern forms a 256-order super cubic lattice ($2^{256}$). It is degenerated to $2^{64}$ in the third layer, to $2^{16}$ in the second layer and to $2^4$ in the first layer.

The structure/rule of the neural network is not limited to the above.

(2) Classification Tree Preparation Phase

All of the learning templates ($LT_{i,j}$) (ten categories each having 100 patterns) are developed into the neural network as shown in FIG. 3 in the neural network developing phase (1). The preparation of the classification tree is conducted from the upper (first) layer to the lower (fourth) layer as opposed to the development of the neural network.

A root node starts from a virtual neuron above the highest layer (first layer 2×2) of FIG. 3.

As the development of the learning templates ($LT_{i,j}$), at least one of the neurons in the highest order layer (2×2) of FIG. 3 is on. (Not all neurons in the highest order layer (2×2) is off except when a totally white learning template is present). Accordingly, the activity of the virtual highest order neuron is on for all learning templates ($LT_{i,j}$).

Figure 7:
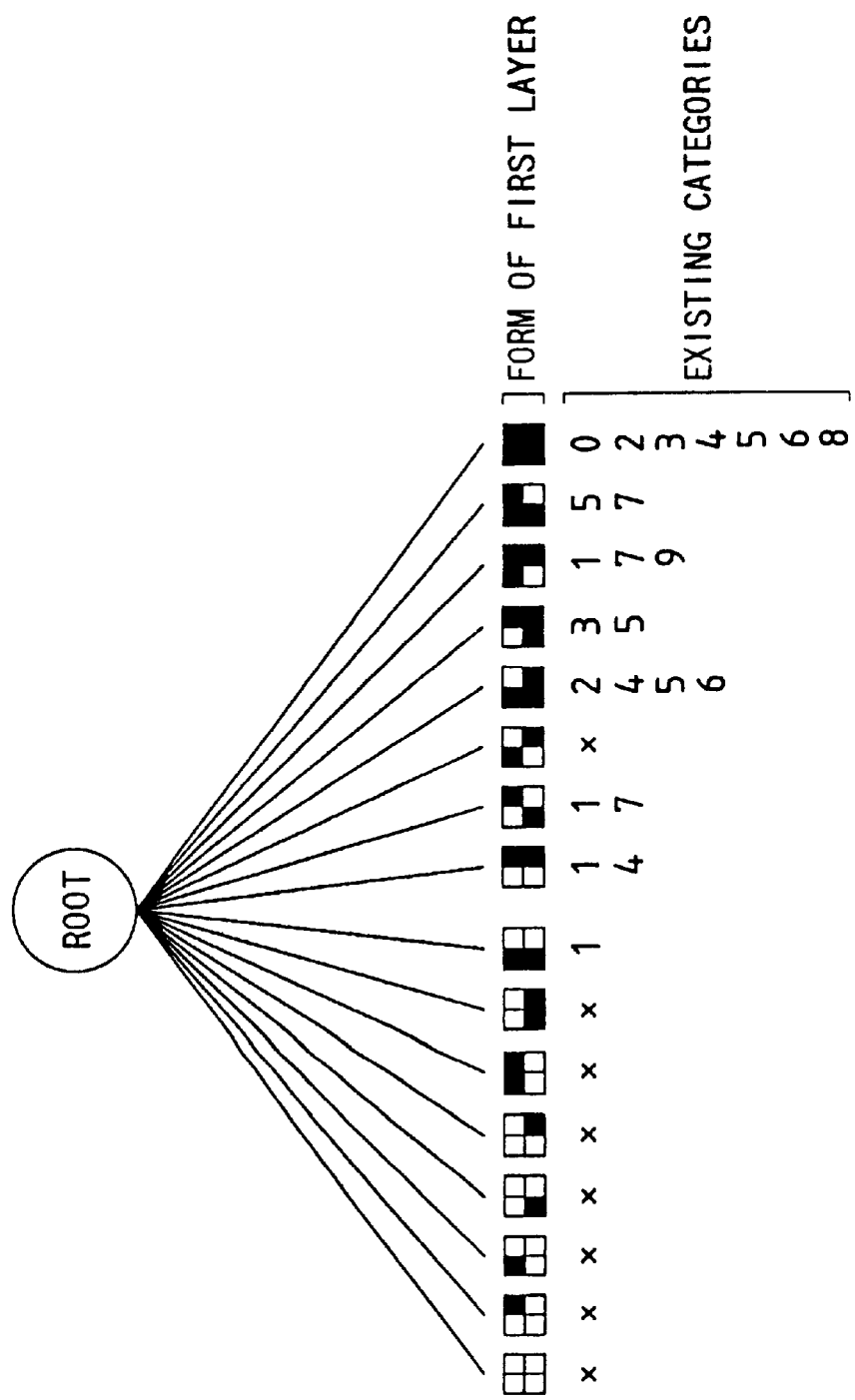
FIG. 7 shows a classification tree preparation process of the embodiment.

Since there are $2^4=16$ states of the highest order layer (2×2) (more exactly, 15 states because there is no all-off state as explained above), 16 branches extend from the root node (see FIG. 7).

The number of learning templates ($LT_{i,j}$) which are present in each branch is counted. The subsequent process branches depending on the result.

(1) No learning template ($LT_{i,j}$) is present:
 The branch is deleted.
(2) Only templates in certain category (for example, '1') are present in the learning templates ($LT_{i,j}$):
 If the branch is determined, the category will be uniquely determined and the branch is defined as a leaf and assigned with a category number (for example, '1'). (3) Other than (1) and (2) above, that is, templates of a plurality of categories are mixedly present:
 The branch is defined as a node to continue the preparation of the classification tree. FIG. 7 shows a result of the above process. The branch states are shown by showing firing states of the neurons of the highest order layer (first layer) of FIG. 3. (Black represents on and white represents off).

The branch for which the type of existing category is x corresponds to the case (1) "No learning template ($LT_{i,j}$) is present" and it is deleted. (Strictly speaking, since it has been known that there is no totally white pattern, the leftmost branch does not extend from the root.)

In the eighth branch from the left end, only the learning templates of the category '1' are present. This corresponds to the case (2) "Only templates in certain category (for example, '1') are present in the learning templates ($LT_{i,j}$)" and it becomes a leaf.

In the twelfth branch from the left end, the learning templates of the categories '2', '4', '5' and '6' are present. This corresponds to the case (3) "Other than (1) and (2) above, that is, templates of a plurality of categories are mixedly present" and it becomes a node.

A method for preparing a branch from a node is described.

In preparing the branch from the node, it is desired to prepare a most efficient branch. The most efficient means that most information on the category is derived when the branch is developed.

It is assumed that the branches developed from the node are limited to those branches developed toward lower layers from the on-state neurons in the node. For example, for the twelfth branch from the left end in FIG. 7, one neuron is selected from three neurons at the left top and the right button in the first layer of FIG. 3 and branches are developed for the states of the neurons below those neurons, that is, the lower four neurons of the second layer of FIG. 3.

As a result, a calculation time required for the development of the branches is significantly reduced. Such restriction does not essentially damage the classification function of the classification tree.

A method for selecting a most efficient neuron among the on-state neuron in the node when they are developed is now explained.

Assuming that the number of learning templates having the category number i among the learning templates ($LT_{i,j}$) present in a node is represented by $N_i$ and the total number of the learning templates present in the node is represented by N, a probability $p_i$ of presence of the respective category in the node is represented by $p_i=N_i/N$, where $$N = \sum_{i=0}^{9} N_i$$

Accordingly, an entropy when the node information is derived is expressed by:

$$Entropy_{node} = -\sum_{i=0}^{9} p_i \log(p_i) = -\sum_{i=0}^{9} \frac{N_i}{N} \log\left(\frac{N_i}{N}\right) \quad (1)$$

$$= \frac{1}{N} \sum_{i=0}^{9} N_i (\log N - \log N_i)$$

One on-state node in the node is selected and a decrease of the entropy when branches are developed therefrom is calculated.

As described above, the number of branches when one neuron is developed toward the lower layer is 16. A manner of distribution of the learning templates ($LT_{i,j}$) to the sixteen branches is shown by the number $N_{i,b}$ of the learning templates ($LT_{i,j}$) present in the developed branches, where i represents the category number and b represents the branch number. An entropy when the respective branch information is derived is given by:

$$Entropy_{branch} = -\sum_{i=0}^{9} p_i \log(p_i) = -\sum_{i=0}^{9} \frac{N_{i,b}}{N_b} \log\left(\frac{N_{i,b}}{N_b}\right) \quad (2)$$

$$= \frac{1}{N_b} \sum_{i=0}^{9} N_{i,b} (\log N_b - \log N_{i,b})$$

where $$N_b = \sum_{i=0}^{9} N_{i,b}$$

represents a total number of learning templates ($LT_{i,j}$) present in the branches.

A probabitility to go to the respective branches is given by:

$$\frac{N_b}{N}$$

Since N is same as the N in the formula (1), an average entropy when the branches are developed is given by:

$$\overline{Entropy_{branch}} = \frac{1}{N} \sum_{b=1}^{16} \sum_{i=0}^{9} N_{i,b} (\log N_b - \log N_{i,b}) \quad (3)$$

Thus, an average decrease of the entropy is given by:

$$EntropyDecrease = Entropy_{node} - \overline{Entropy_{branch}} \quad (4)$$

A quotient of the formula (4) divided by the number of branches.

$$\frac{EntropyDecrease}{BranchNumber} \quad (5)$$

represents a classification efficiency when the branches are developed.

A neuron having a maximum value for the formula (5) is selected and the branches are developed.

Instead of developing only one neuron, the branch may be developed for a group of neurons.

In this case, the Branch Number in the formula (5) is equal to the number of neurons×16. (Strictly speaking, the Branch Number is equal to the number of neurons×15 since it is not possible that all neurons in the lower layer are off.)

In the present embodiment, the value represented by the formula (5) is adopted as the value to represent the classification efficiency when the branches are developed but other value than the formula (5) may be used for a function representing the development efficiency of the branches of "Gini criterion" described in the reference "Classification and Regression Trees".

When a neuron or a set of neurons to be developed is determined, the branches are developed and leaves and nodes are prepared. When all finally become leaves, the preparation of the classification tree is completed.

Figure 8:
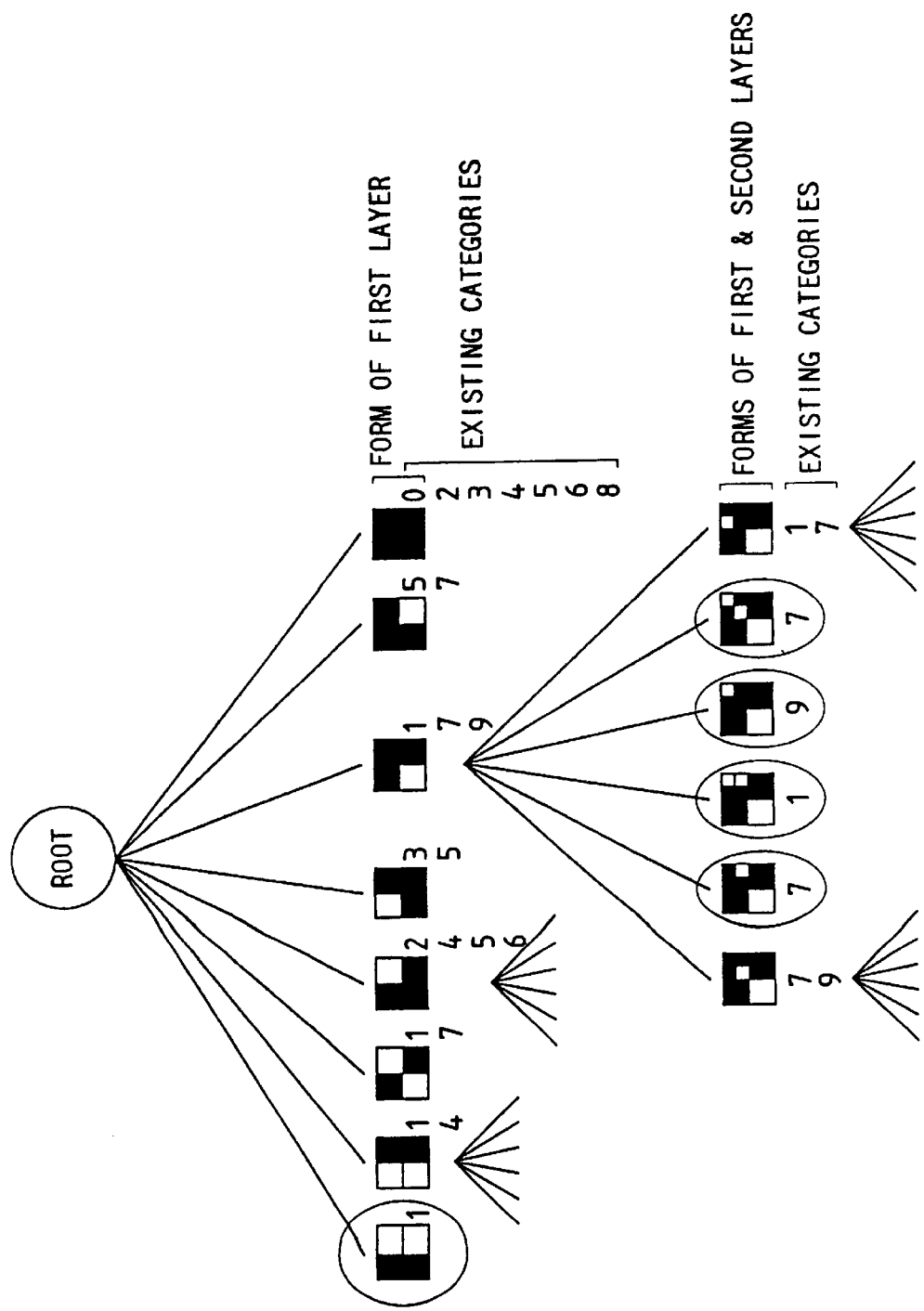
FIG. 8 shows a classification tree of the embodiment.

FIG. 8 shows a content of classification tree actually prepared.

FIG. 8 shows a detail of FIG. 7 with the deleted branches being omitted. The branches with circles in FIG. 8 indicate that they are leaves.

Since all branches other than leaves become nodes, the branches are developed further deeply. In FIG. 8, the result of the further development of the branches is shown for only the third node from the right end. In the third node from the right end, three categories '1', '7' and '9' coexist and the development of branches is needed. It is assumed that in the third node from the right end, the neuron in the first layer to be developed is determined as the right top neuron in the first layer in the development variable discrimination step. Then, $2^4$=16 branches are developed for the state of the right top neuron as they are in FIG. 7 and some branches are deleted, some branches become leaves and some branches become nodes in accordance with the above conditions (1) to (3).

The leaves which become the nodes should further develop the branches and finally the ends of all branches are leaves.

In FIG. 8, the result of development of the third node from the right end is shown by overwriting the first layer and the second layer for simplification. In actuality, the states are represented in the four neurons of the first layer and the four right top neurons of the second layer of the neural network shown in FIG. 3.

The actual recognition process may be conducted along the classification tree prepared in the manner described above or by making the leaves prepared by the classification tree into the form of templates.

[Embodiment 2]

In the neural network development phase (1) of the Embodiment 1, the neural structure/rule is set as follows:

If two or more neurons of the lower layer 2×2 neurons are on, one neuron on the above layer is on and others are off.

In this case, it is not always true that the information of only the on-state neuron degenerates as it is in the Embodiment 1. Accordingly, in the classification tree preparation phase (2), a neuron or a set of neurons to be developed, including off-state neurons, should be selected. It may be implemented in the same manner as that of the Embodiment 1.

Thus, the limitation to the neural network structure/rule is essentially zero and it is only needed that certain degree of continuity is assured.

For example, for the states of the branches of FIG. 7, the rule in the Embodiment 1 is that the leftmost neurons of the lower four neurons is off and others are on, and the rule of the present embodiment is that the neurons up to the fifth from the left end are off and others are on.

The boundary of off and on may be arbitrarily set in the array of states of FIG. 7 because the rule/mapping continuity is assured.

What is claimed is:

1. An information processing method comprising the steps of:

inputting a plurality of learning patterns;

generating, for each one of the plurality of learning patterns input in said inputting step, one hierarchical structure comprising a plurality of layers based on one learning pattern, the plurality of layers having respective different orders; and preparing a classification tree comprising a plurality of branches, wherein each of the branches has a plurality of neurons and is developed from an upper layer to a lower layer by selecting at least one neuron of each of the branches, said one neuron having a maximum value for classification efficiency based on the characteristics of each layer of the plurality of hierarchical structures generated for the plurality of learning patterns in said generating step and by developing the selected at least one neuron.

2. An information processing method according to claim 1, wherein characteristic variables of the learning pattern are stepwise degenerated in said generating step.

3. An information processing method according to claim 2, wherein said preparation step comprises selecting a variable based on a relation between an upper hierarchy layer and a lower hierarchy layer, and develops the degenerated variables toward the lower hierarchy layer in accordance with a result of the selection.

4. An information processing method according to claim 1, wherein an input pattern is recognized by using the prepared classification tree.

5. An information processing method according to claim 1, wherein a recognition template is prepared based on the prepared classification tree, and an input pattern is recognized by using the template.

6. An information processing method according to claim 4, wherein the input pattern is hand-written character pattern.

7. An information processing method according to claim 5, wherein the input pattern is a hand-written character pattern.

8. An information processing method according to claim 4, wherein the input pattern is an optically read character pattern.

9. An information processing method according to claim 5, wherein the input pattern is an optically read character pattern.

10. An information processing method according to claim 4, wherein the input pattern is a sound pattern.

11. An information processing method according to claim 5, wherein the input pattern is a sound pattern.

12. An information processing method according to claim 4, wherein a recognition result is displayed on a display unit.

13. An information processing method according to claim 5, wherein a recognition result is displayed on a display unit.

14. An information processing method according to claim 4, wherein the input pattern to be recognized is inputted by a tablet.

15. An information processing method according to claim 5, wherein the input pattern to be recognized is inputted by a tablet.

16. An information processing method according to claim 4, wherein the input pattern to be recognized is inputted by a scanner.

17. An information processing method according to claim 5, wherein the input pattern to be recognized is inputted by a scanner.

18. An information processing method according to claim 4, wherein the input pattern to be recognized is inputted by a microphone.

19. An information processing method according to claim 5, wherein the input pattern to be recognized is inputted by a microphone.

20. An information processing apparatus comprising:

inputting means for inputting a plurality of learning patterns;

generating means for generating, for each one of the plurality of learning patterns input by said inputting means, one hierarchical structure comprising a plurality of layers based on one learning pattern, the plurality of layers having respective different orders; and classification tree preparation means for preparing a classification tree comprising a plurality of branches wherein each of the branches has a plurality of neurons and is developed from an upper layer to a lower layer by selecting at least one neuron of said each of the branches, said one neuron having a maximum value for classification efficiency based on the characteristics of each layer of the plurality of hierarchical structures generated for the plurality of learning patterns by said generating means, and by developing the selected at least one neuron.

21. An information processing apparatus according to claim 20, wherein said generating means includes means for degenerating characteristic variables of the learning pattern stepwise.

22. An information processing apparatus according to claim 21, wherein said classification tree preparation means includes means for selecting a variable based on a relation between an upper hierarchy layer and a lower hierarchy layer, and develops the degenerated variables toward the lower hierarchy layer in accordance with a result by said selection means.

23. An information processing apparatus according to claim 20, further comprising recognition means for recognizing an input pattern by using the prepared classification tree.

24. An information processing apparatus according to claim 20, further comprising recognition means for preparing recognition template based on the prepared classification tree and recognizing the input pattern by using the template.

25. An information processing apparatus according to claim 23, wherein the input pattern is a hand-written character pattern.

26. An information processing apparatus according to claim 24, wherein the input pattern is a hand-written character pattern.

27. An information processing apparatus according to claim 23, wherein the input pattern is an optically read character pattern.

28. An information processing apparatus according to claim 24, wherein the input pattern is an optically read character pattern.

29. An information processing apparatus according to claim 23, wherein the input pattern is a sound pattern.

30. An information processing apparatus according to claim 24, wherein the input pattern is a sound pattern.

31. An information processing apparatus according to claim 23, wherein the recognition result is displayed on a display unit.

32. An information processing apparatus according to claim 24, wherein the recognition result is displayed on a display unit.

33. An information processing apparatus according to claim 23, wherein the input pattern to be recognized is inputted by a tablet.

34. An information processing apparatus according to claim 24, wherein the input pattern to be recognized is inputted by a tablet.

35. An information processing apparatus according to claim 23, wherein the input pattern to be recognized is inputted by a scanner.

36. An information processing apparatus according to claim 24, wherein the input pattern to be recognized is inputted by a scanner.

37. An information processing apparatus according to claim 23, wherein the input pattern to be recognized is inputted by a microphone.

38. An information processing apparatus according to claim 24, wherein the input pattern to be recognized is inputted by a microphone.

39. A computer readable medium storing instructions for causing a computer to perform an information processing method, said method comprising the steps of:

inputting a plurality of learning patterns;

generating, for each one of the plurality of learning patterns input in said inputting step, one hierarchical structure comprising a plurality of layers based on one learning pattern, the plurality of layers having respective different orders; and preparing a classification tree comprising a plurality of branches wherein each of the branches has a plurality of neurons and is developed from an upper layer to a lower layer by selecting at least one neuron of said each of the branches, said one neuron having a maximum value for classification efficiency based on the characteristics of each layer of the plurality of hierarchical structures generated for the plurality of learning patterns in said generating step, and by developing the selected at least one neuron.

40. A computer readable medium according to claim 39, wherein characteristic variables of the learning pattern are stepwise degenerated in said generating step.

41. A computer readable medium according to claim 40, wherein said preparation step comprises selecting a variable based on a relation between an upper hierarchy layer and a lower hierarchy layer, and develops the degenerated variables toward the lower hierarchy layer in accordance with a result of the selection.

42. A computer readable medium according to claim 39, wherein an input pattern is recognized by using the prepared classification tree.

43. A computer readable medium according to claim 39, wherein a recognition template is prepared based on the prepared classification tree, and the input pattern is recognized by using the template.

44. A computer readable medium according to claim 42, wherein the input pattern is a hand-written character pattern.

45. A computer readable medium according to claim 43, wherein the input pattern is a hand-written character pattern.

46. A computer readable medium according to claim 42, wherein the input pattern is an optically read character pattern.

47. A computer readable medium according to claim 43, wherein the input pattern is an optically read character pattern.

48. A computer readable medium according to claim 42, wherein the input pattern is a sound pattern.

49. A computer readable medium according to claim 43, wherein the input pattern is a sound pattern.

50. A computer readable medium according to claim 42, wherein a recognition result is displayed on a display unit.

51. A computer readable medium according to claim 43, wherein a recognition result is displayed on a display unit.

52. A computer readable medium according to claim 42, wherein the input pattern to be recognized is inputted by a tablet.

53. A computer readable medium according to claim 43, wherein the input pattern to be recognized is inputted by a tablet.

54. A computer readable medium according to claim 42, wherein the input pattern to be recognized is inputted by a scanner.

55. A computer readable medium according to claim 43, wherein the input pattern to be recognized is inputted by a scanner.

56. A computer readable medium according to claim 42, wherein the input pattern to be recognized is inputted by a microphone.

57. A computer readable medium according to claim 43, wherein the input pattern to be recognized is inputted by a microphone.

58. An information processing method according to claim 1, wherein the selected at least one neuron is selected among on-state neurons.

59. An information processing apparatus according to claim 20, wherein the selected at least one neuron is selected among on-state neurons.

60. An computer readable medium according to claim 39, wherein the selected at least one neuron is selected among on-state neurons.

* * * * *